US009584936B2

(12) United States Patent
Bychenko

(10) Patent No.: US 9,584,936 B2
(45) Date of Patent: Feb. 28, 2017

(54) METHOD FOR CONTROLLING SOUND IN AN AUDITORIUM

(71) Applicant: Nikolay Lazarevich Bychenko, Moscow (RU)

(72) Inventor: Nikolay Lazarevich Bychenko, Moscow (RU)

( * ) Notice: Subject to any disclaimer, the term of this patent is extended or adjusted under 35 U.S.C. 154(b) by 13 days.

(21) Appl. No.: 14/751,619

(22) Filed: Jun. 26, 2015

(65) Prior Publication Data

US 2016/0007129 A1 Jan. 7, 2016

Related U.S. Application Data

(63) Continuation of application No. PCT/RU2013/000104, filed on Nov. 14, 2013.

(30) Foreign Application Priority Data

Dec. 27, 2012 (RU) ................................ 2012157169

(51) Int. Cl.

| | |
|---|---|
| ***H04R 27/00*** | (2006.01) |
| ***H04B 3/00*** | (2006.01) |
| ***A63J 5/04*** | (2006.01) |
| ***A63J 25/00*** | (2009.01) |
| ***H04R 1/40*** | (2006.01) |
| ***H04R 3/12*** | (2006.01) |
| ***H04R 5/02*** | (2006.01) |
| ***H04S 7/00*** | (2006.01) |

(52) U.S. Cl.

CPC ................ *H04R 27/00* (2013.01); *A63J 5/04* (2013.01); *A63J 25/00* (2013.01); *H04R 1/403* (2013.01); *H04R 3/12* (2013.01); *H04R 5/023* (2013.01); *H04S 7/30* (2013.01); *H04R 2420/03* (2013.01); *H04S 2400/11* (2013.01)

(58) Field of Classification Search

CPC .......... H04R 27/00; H04R 5/023; H04R 3/12; H04R 1/403; H04R 2420/03; H04S 7/30; H04S 2400/11; A63J 25/00; A63J 5/04

See application file for complete search history.

(56) References Cited

U.S. PATENT DOCUMENTS

| | | | | |
|---|---|---|---|---|
| 5,765,314 | A | 6/1998 | Giglio et al. | |
| 7,092,542 | B2 | 8/2006 | McGrath | |
| 2002/0006206 | A1 * | 1/2002 | Scofield | H04S 3/002 381/27 |

(Continued)

FOREIGN PATENT DOCUMENTS

| | | | |
|---|---|---|---|
| KR | 20110139613 | | 12/2011 |
| RU | 2104729 | C1 | 2/1998 |

(Continued)

*Primary Examiner* — Muhammad N Edun

(74) *Attorney, Agent, or Firm* — Nadya Reingand; Yan Hankin

(57) ABSTRACT

The present invention relates to the entertainment industry and allows to improve the sound quality in audiences for different purposes. The implementation of the present control method is based on the creation of sound clusters, each of them can include any number of nearby located seats equipped with sound reproduction systems. The sound movement through the audience is created by the activation and following deactivation of the acoustic equipment in the mentioned clusters according to the indicated trajectory.

11 Claims, 17 Drawing Sheets

(56) References Cited

U.S. PATENT DOCUMENTS

| | | | | |
|---|---|---|---|---|
| 2009/0189977 | A1* | 7/2009 | Delia | G06Q 10/06 348/61 |
| 2010/0205867 | A1 | 8/2010 | Park | |
| 2014/0119581 | A1* | 5/2014 | Tsingos | H04S 3/008 381/300 |

FOREIGN PATENT DOCUMENTS

| | | | |
|---|---|---|---|
| RU | 9589 | U1 | 4/1999 |
| RU | 67885 | U1 | 11/2007 |
| WO | 2011162448 | | 12/2011 |

* cited by examiner

METHOD FOR CONTROLLING SOUND IN AN AUDITORIUM

FIELD OF THE INVENTION

The present invention relates to the entertainment industry. More particularly, the present invention relates to a sound controlling invention that provides enhanced audio trajectory over a plurality of seats.

RELATED ART

There are many different well-known and widespread means and methods which allow control of the equipment in audiences for different purposes (theaters, concert halls, cinemas etc.), including the means and methods for controlling the acoustic characteristic and the sound distribution in audiences. One of such solutions described in the U.S. Pat. No. 5,765,314 issued on Jun. 16, 1998 can be viewed as the closest analogue to the present invention. The U.S. Pat. No. 5,765,314 describes a complex control method for the equipment in audiences, including the conventional sound control and seat movements. However, these audio systems still leave much to be desired. Therefore what is needed is a system capable of providing a sound trajectory through an area using speakers mounted in seats in the area.

SUMMARY

The present invention describes a method of sound control performed by activation and following deactivation of acoustic equipment in accordance with the indicated trajectory of the sound movement through the audience. This is ensured by the switching over between the sound speakers located in the audience seats. The present invention constitutes a qualitative development of the sound control technologies in audiences. It assures the dynamic control over the trajectory of the sound wave directly in the audience. The present invention can create and control the linear trajectory of the sound distribution, which leads to a qualitative change of the sound effects accompanying movie screenings or concert events.

The indicated technical results are achieved by using the described method of sound control for audiences that involves the activation and following deactivation of acoustic equipment located in the seats in accordance with the indicated trajectory of the sound movement through the audience. According to the present method the computerized sound processor creates acoustic units, or clusters, each of them can include any number of nearby located seats equipped with sound reproduction systems. In the minimum possible case the acoustic unit consists of one single seat in the audience. In the maximum possible case it consists of all seats in the audience. The acoustic clusters move through the audience in every given direction according to the prescribed trajectory of sound movements as determined by the computerized sound processor. The sound movement is performed through the activation/deactivation of the seat-based speaker systems that belong to the particular acoustic cluster. The sound movement trajectory instruction for the computerized sound processor is created according to the record on the sound or visual medium, predominantly on a film tape or a digital sound medium that is used for sound reproduction during movies, concerts or show programs. These sound movement trajectory instructions may be established at the time of recording, or may be added or created after the recording during sound processing, in varying embodiments.

BRIEF DESCRIPTION OF THE DRAWINGS

The present invention is explained by the following graphic materials.

DETAILED DESCRIPTION

Figure 1:
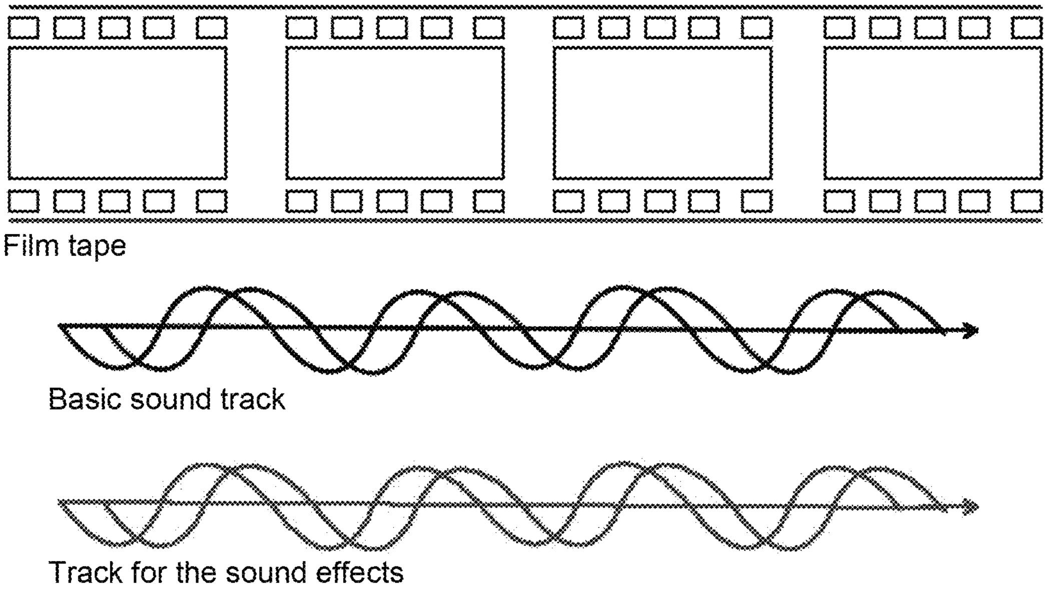
FIG. 1: Schematic illustration of the means which ensure the sound movement control.
Figure 2:
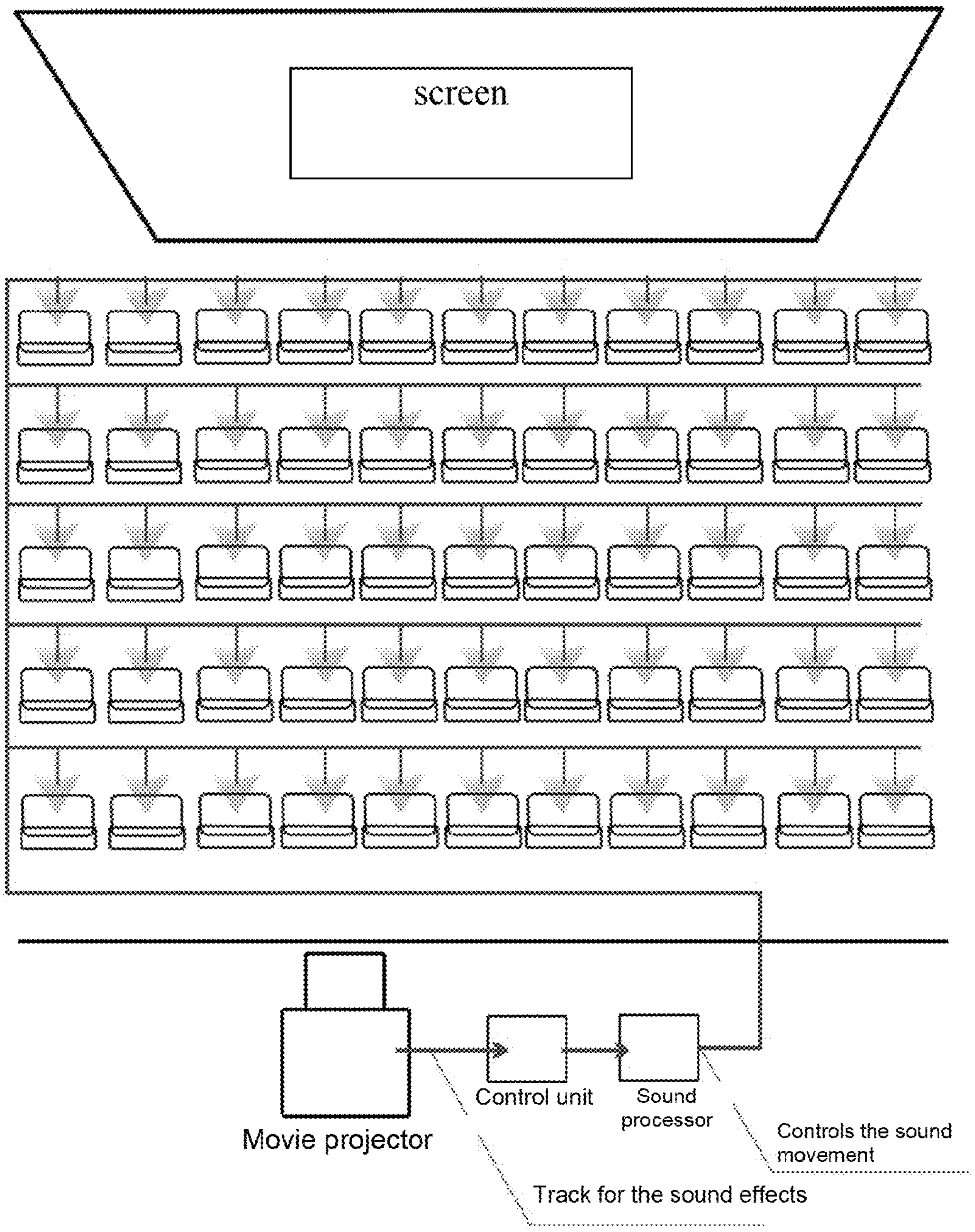
FIG. 2: Schematic illustration of the sound control means in the audience.
Figure 3:
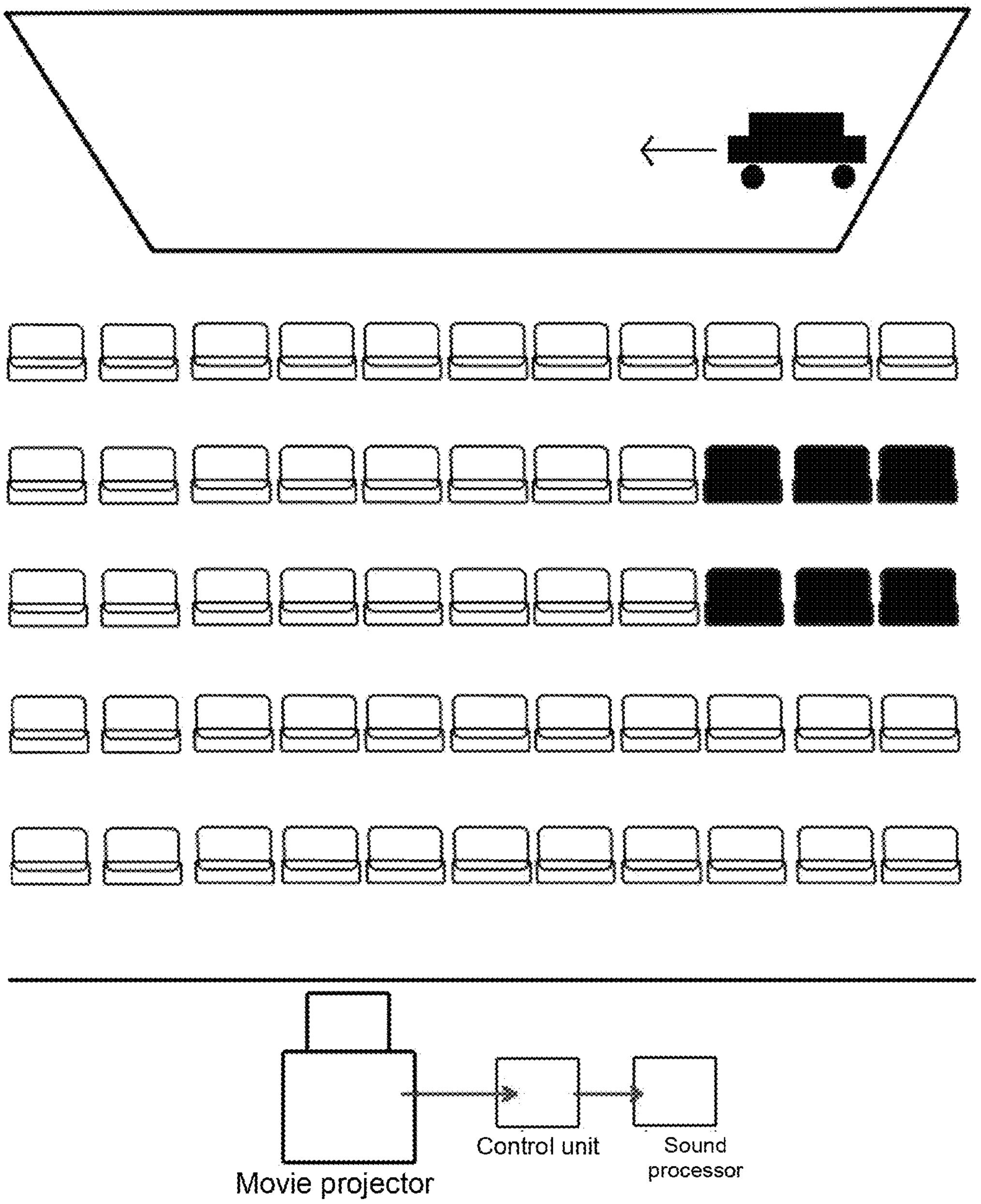
FIG. 3: Schematic illustration of the sound movement trajectory through the audience while a moving car is displayed on the cinema screen.
Figure 4:
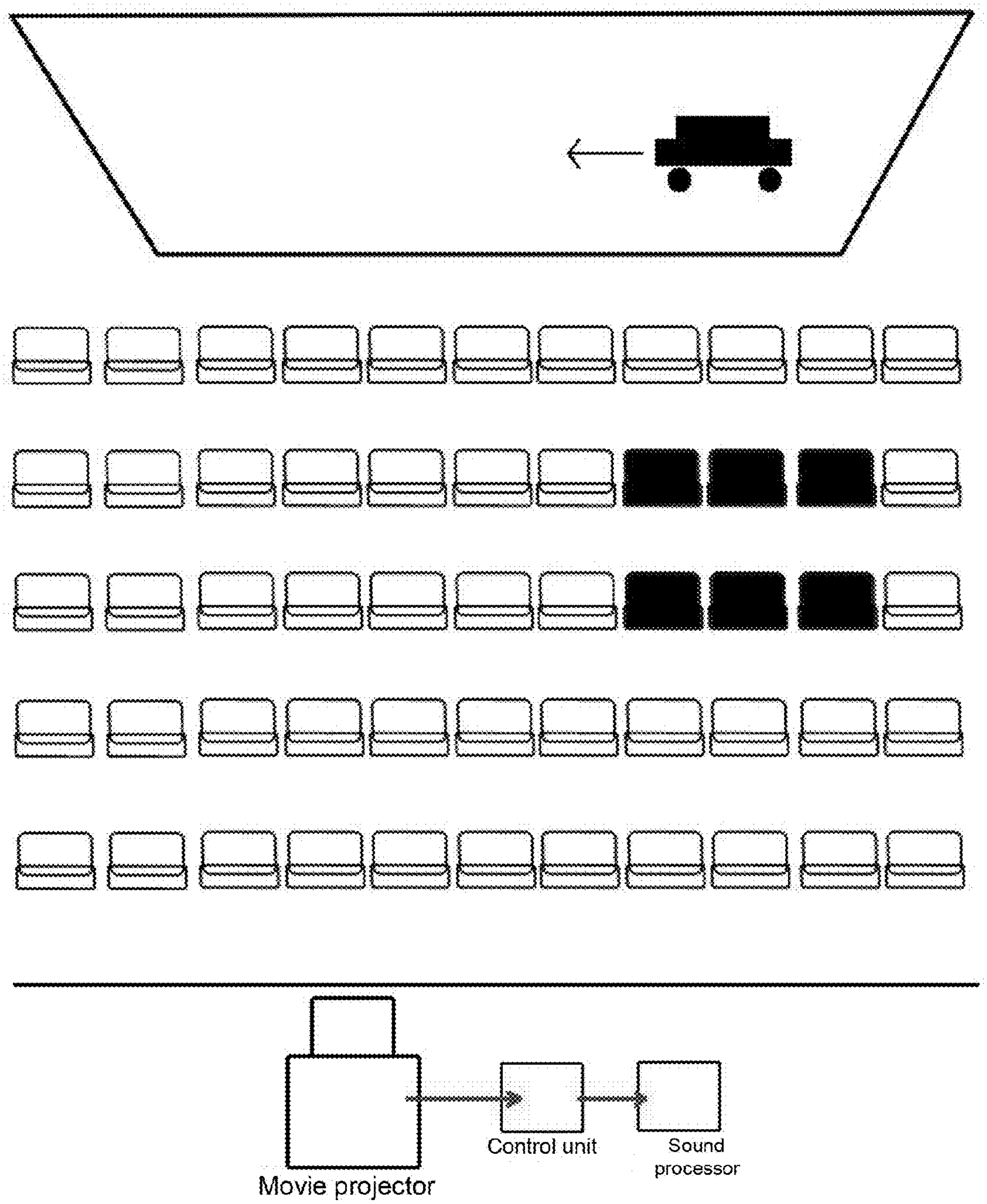
FIG. 4: Schematic illustration of the sound movement trajectory through the audience while a moving car is displayed on the cinema screen.
Figure 5:
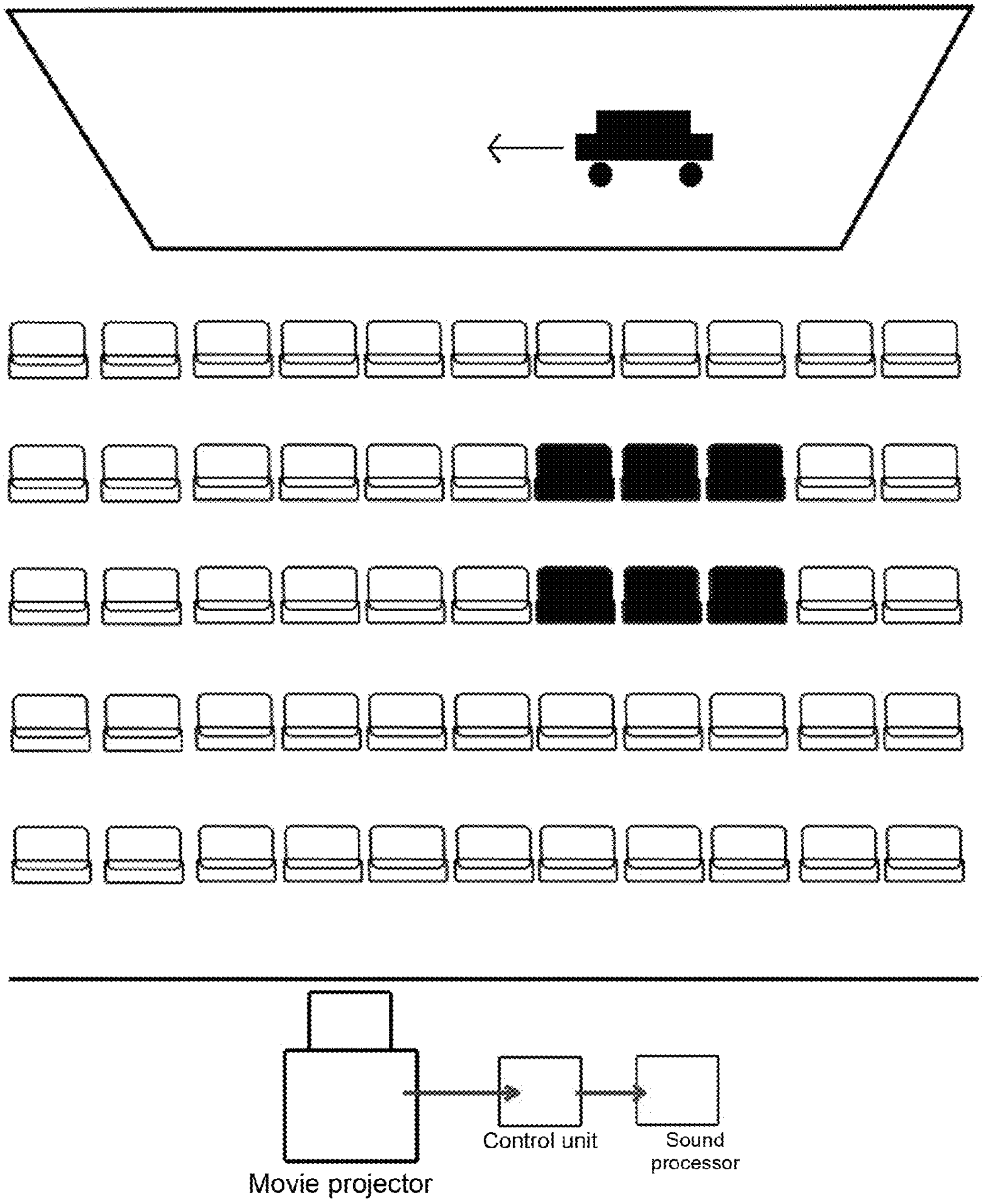
FIG. 5: Schematic illustration of the sound movement trajectory through the audience while a moving car is displayed on the cinema screen.
Figure 6:
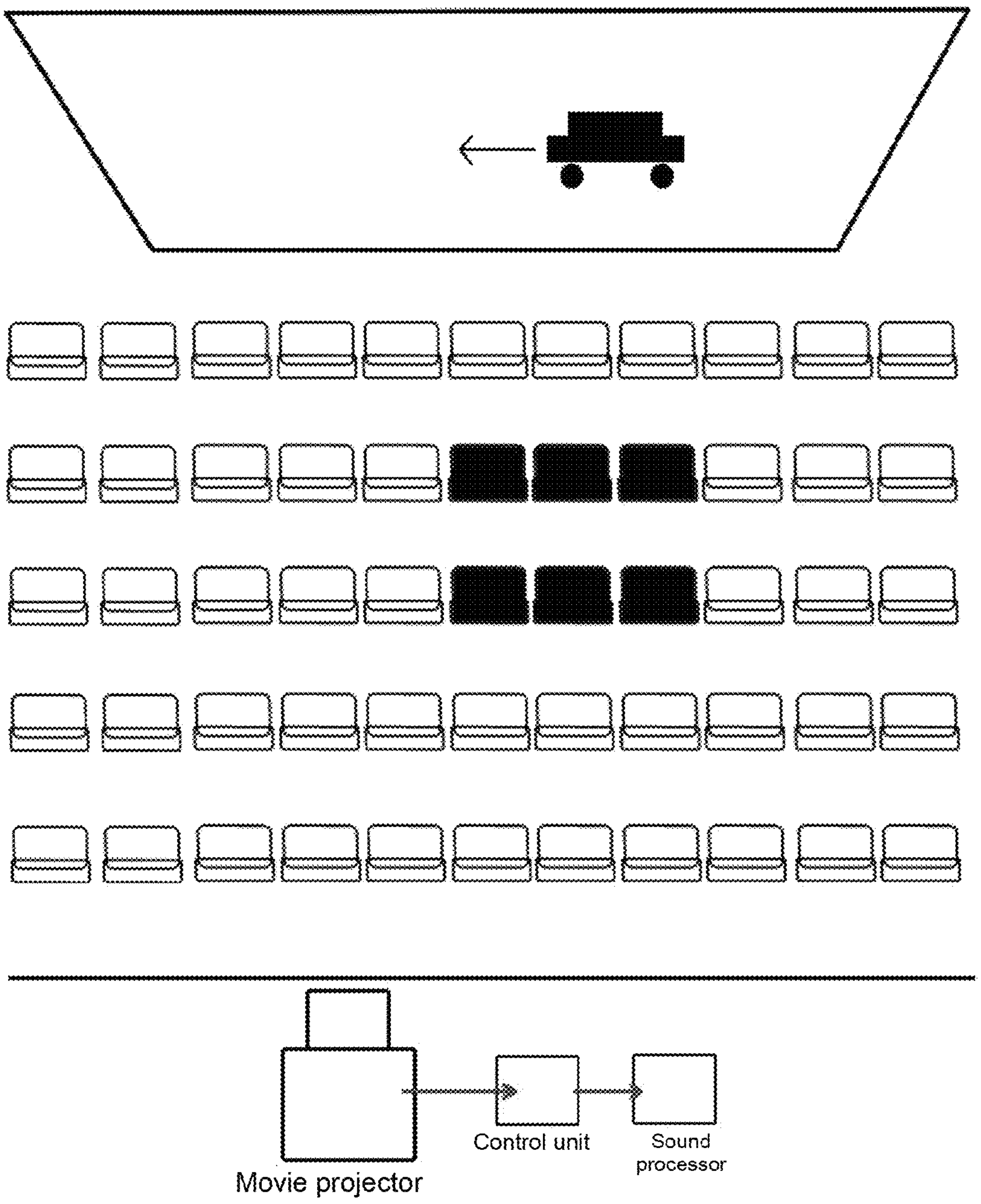
FIG. 6: Schematic illustration of the sound movement trajectory through the audience while a moving car is displayed on the cinema screen.
Figure 7:
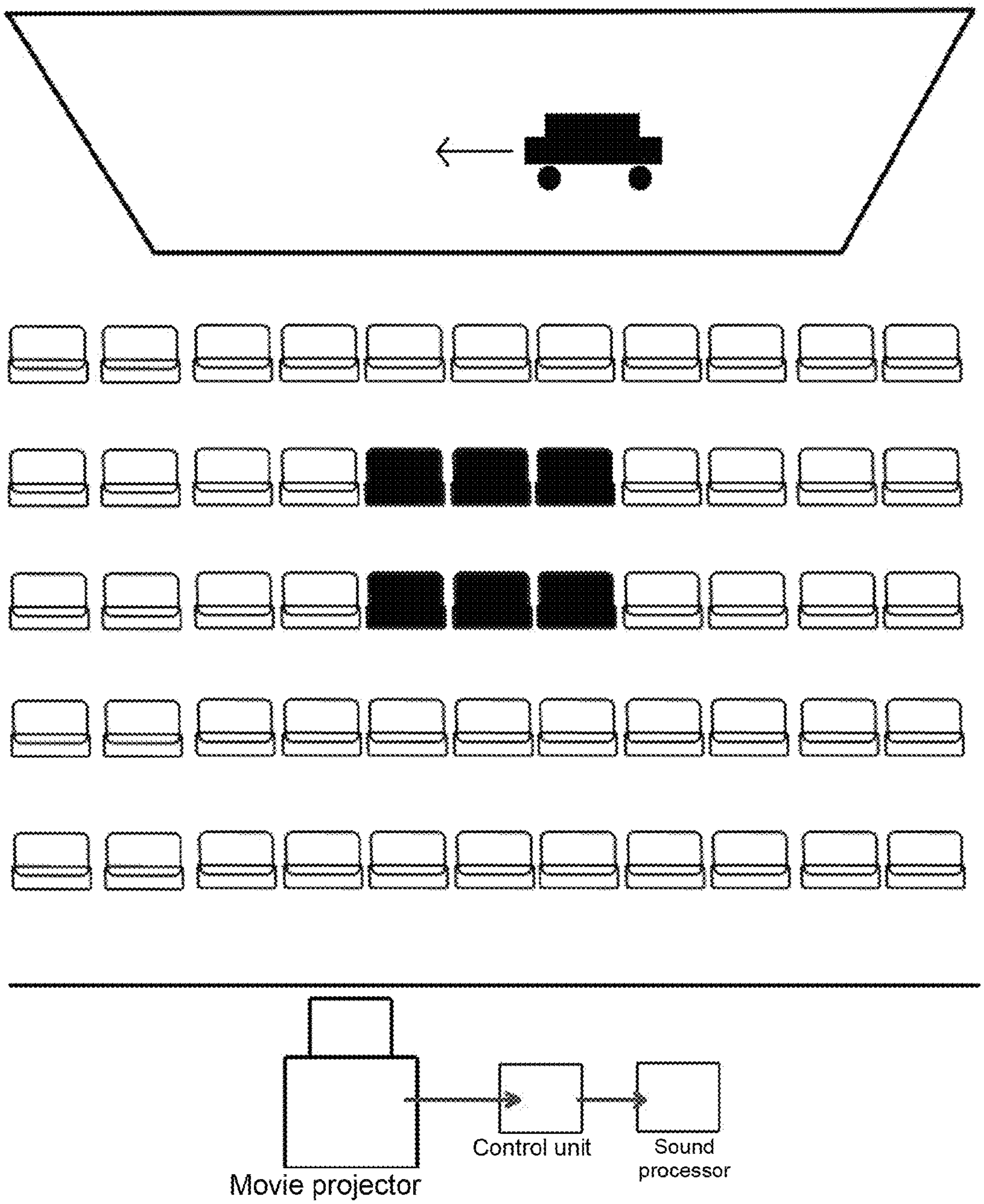
FIG. 7: Schematic illustration of the sound movement trajectory through the audience while a moving car is displayed on the cinema screen.
Figure 8:
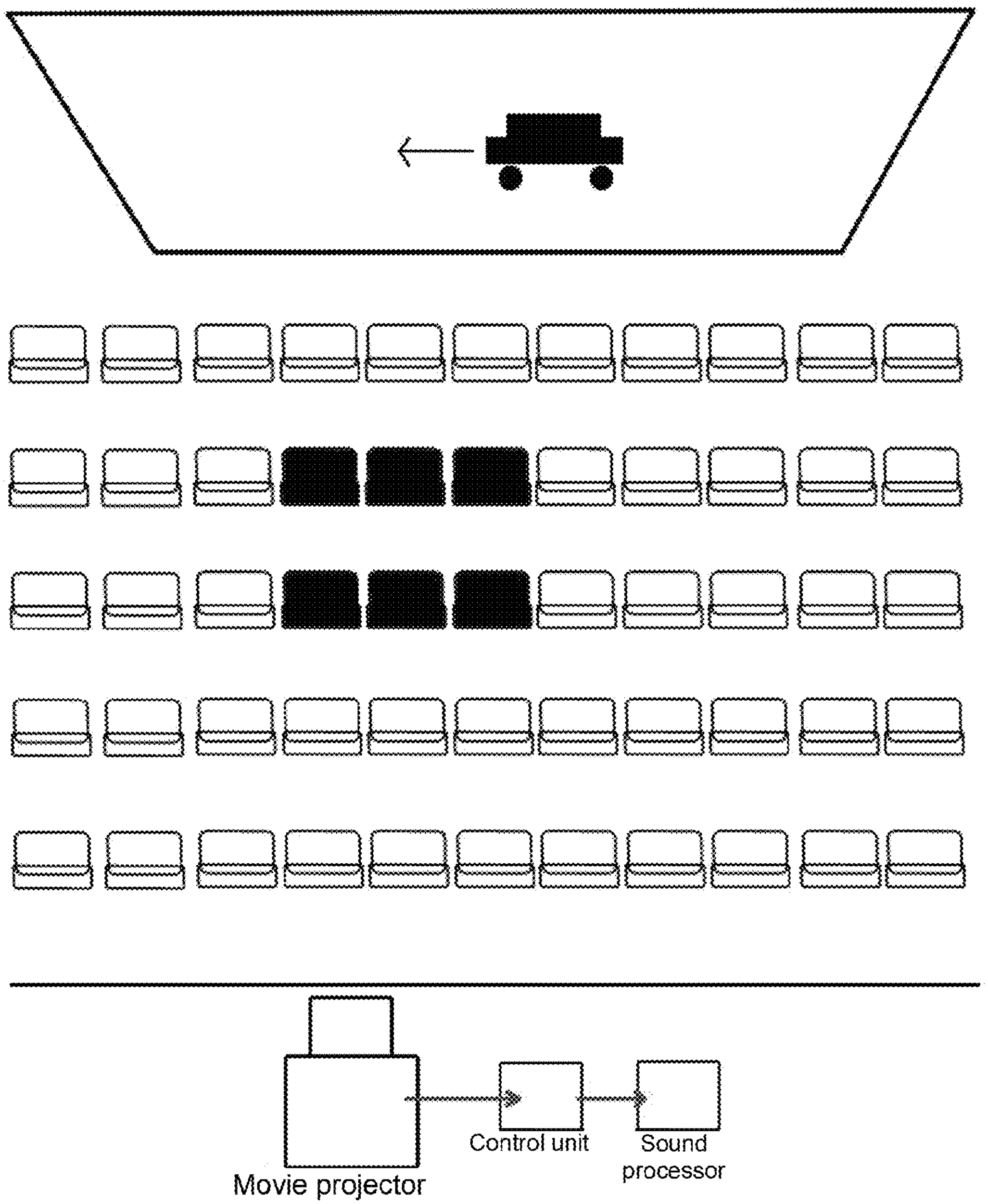
FIG. 8: Schematic illustration of the sound movement trajectory through the audience while a moving car is displayed on the cinema screen.
Figure 9:
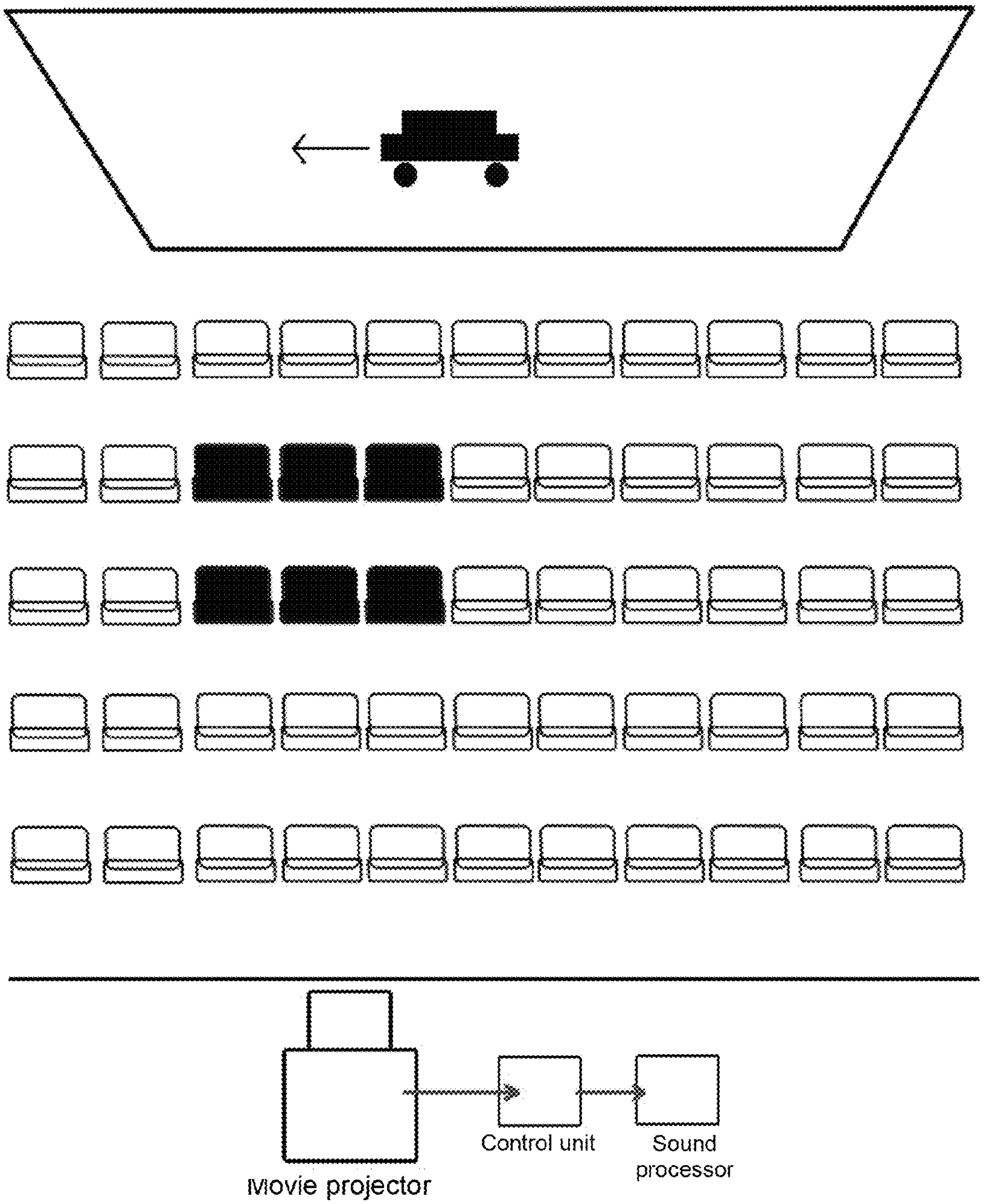
FIG. 9: Schematic illustration of the sound movement trajectory through the audience while a moving car is displayed on the cinema screen.
Figure 10:
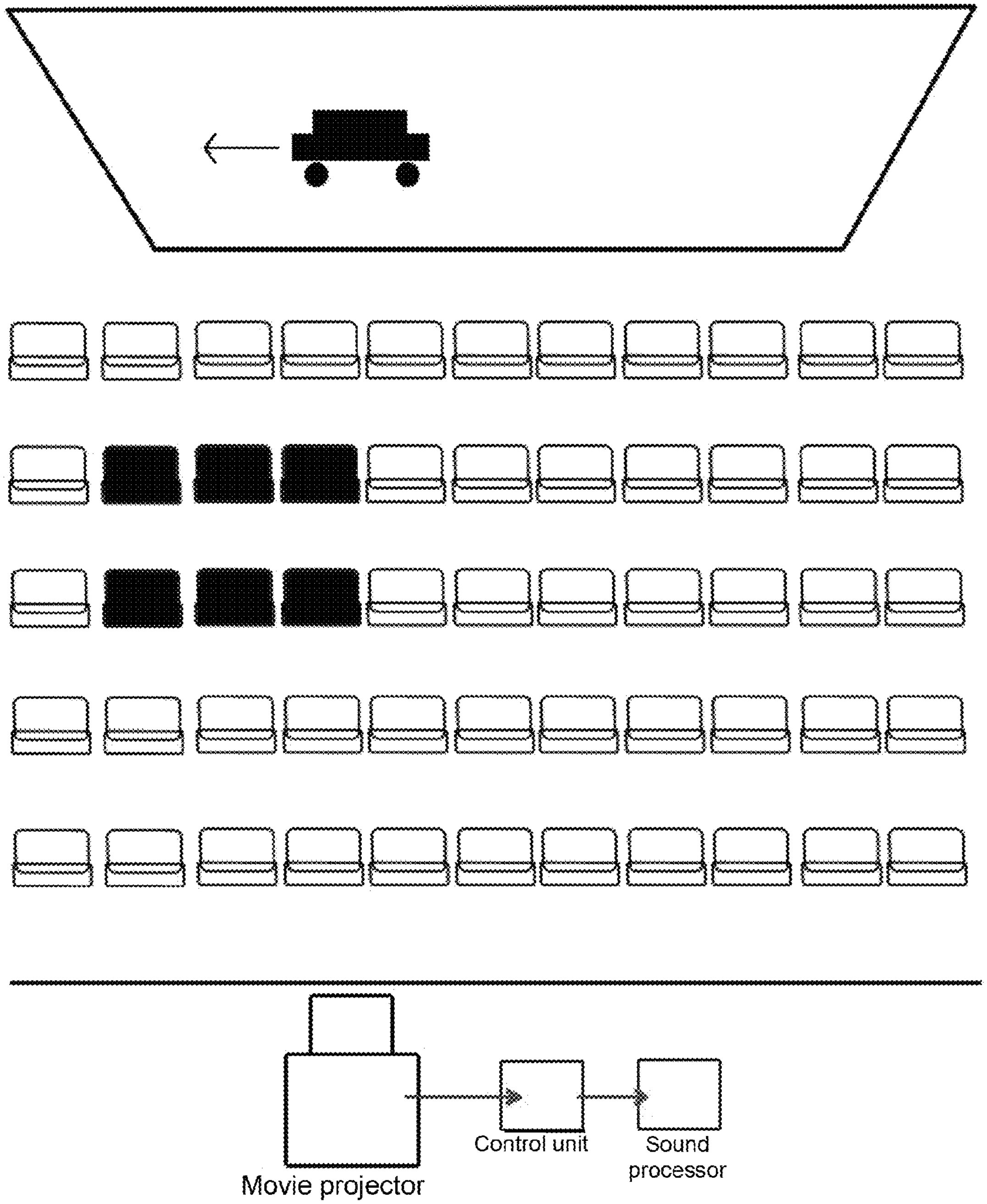
FIG. 10: Schematic illustration of the sound movement trajectory through the audience while a moving car is displayed on the cinema screen.
Figure 11:
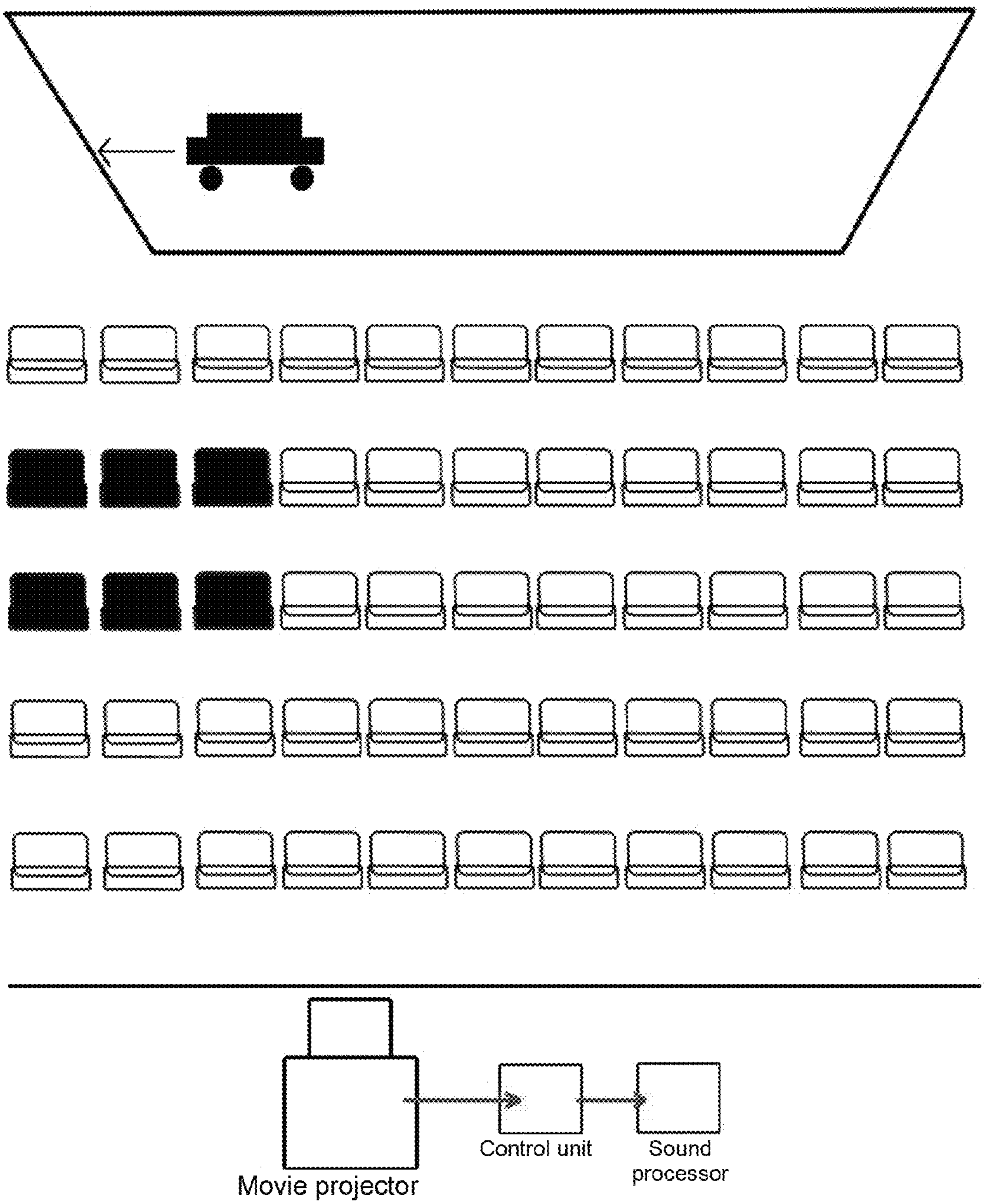
FIG. 11: Schematic illustration of the sound movement trajectory through the audience while a moving car is displayed on the cinema screen.
Figure 12:
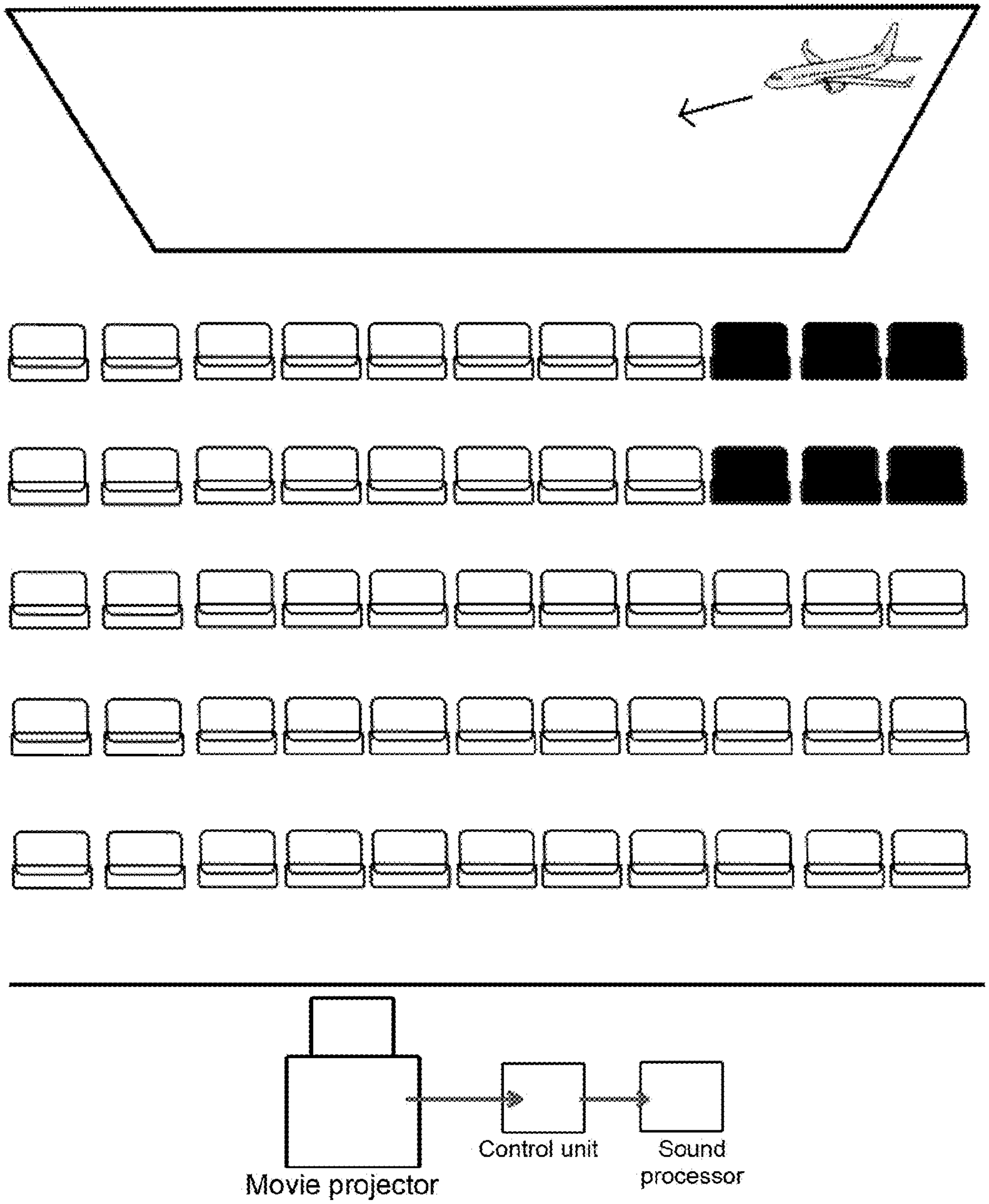
FIG. 12: Schematic illustration of the sound movement trajectory through the audience while a moving airplane is displayed on the cinema screen.
Figure 13:
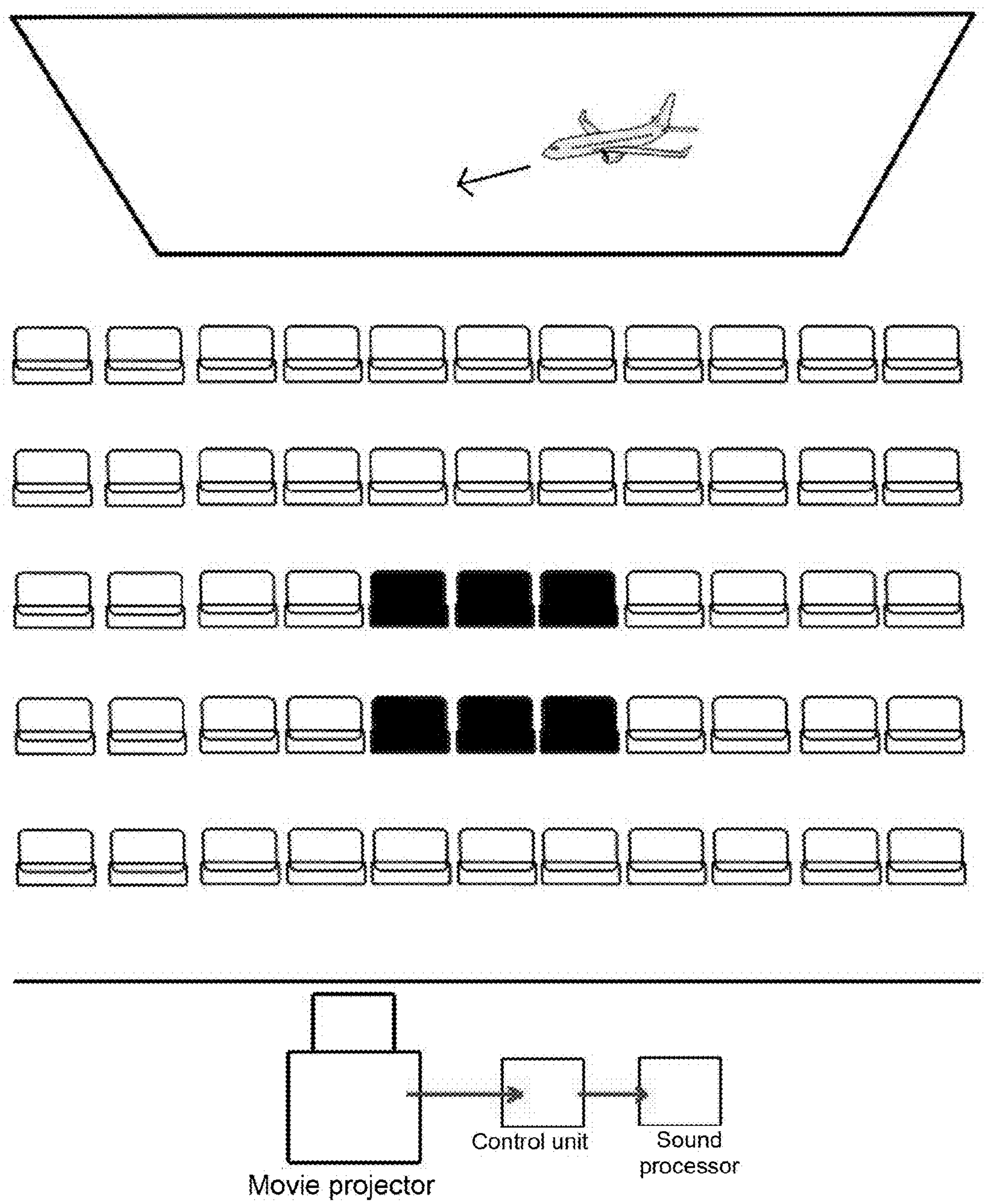
FIG. 13: Schematic illustration of the sound movement trajectory through the audience while a moving airplane is displayed on the cinema screen.
Figure 14:
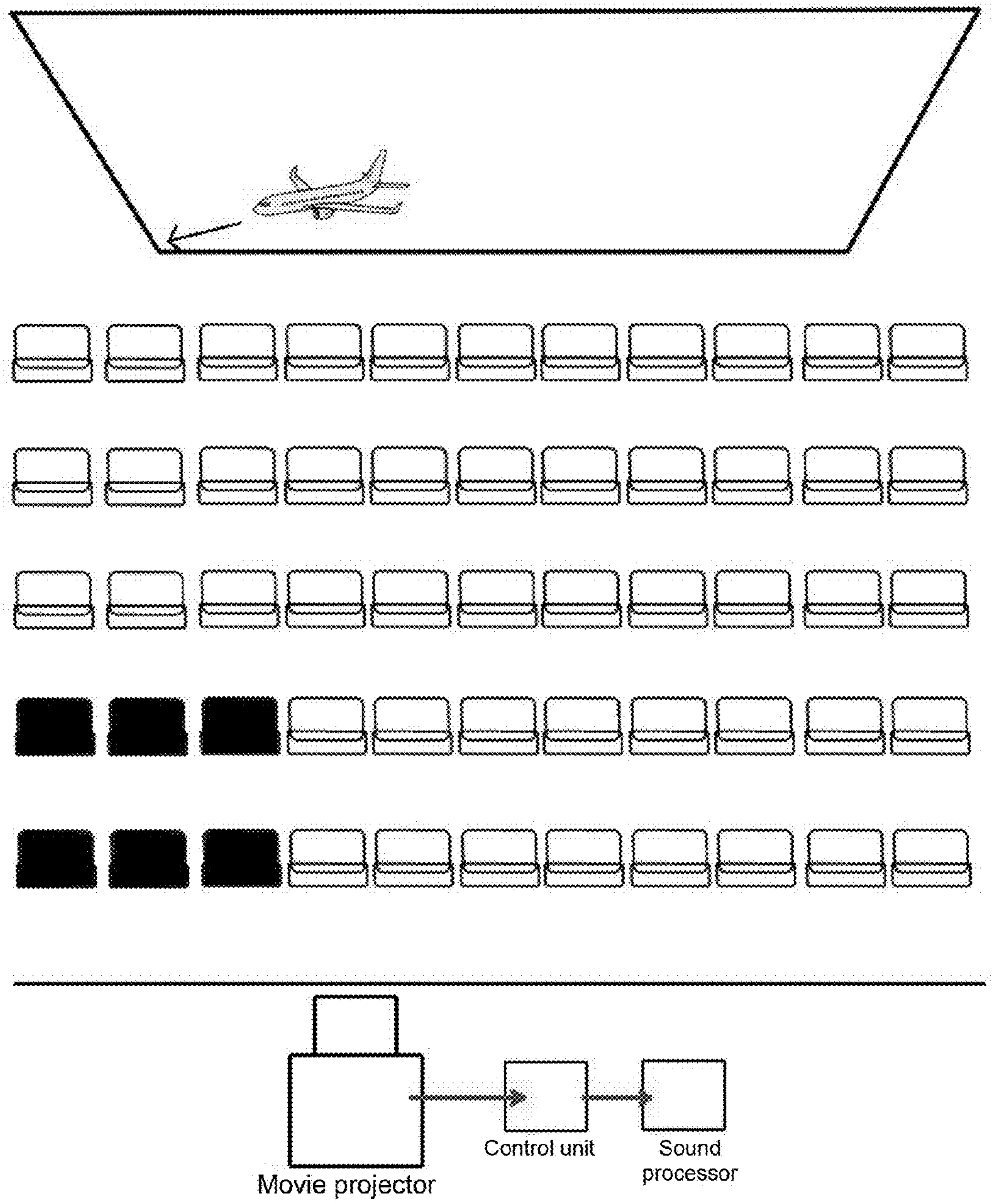
FIG. 14: Schematic illustration of the sound movement trajectory through the audience while a moving airplane is displayed on the cinema screen.

The performance of the present method supposes that there are one or several trajectories for the sound movements through the audience (each trajectory refers to a separate sound action) created according to the actions in the displayed movie or the actions shown on stage. The sound movement trajectory can be arranged on accordance with the record on the film tape or any other sound or visual medium, for example a digital sound medium that is used for sound reproduction during movies, concerts or show programs. When a film tape is used (FIG. 1), its possible to create an additional sound track that records the sound movement trajectory effects. When a movie is displayed (FIG. 2), the different actions on screen or at the stage during a performance are accompanied by a sound movement trajectory through the audience that is based on the sequential activation and deactivation of the sound equipment in the clusters (FIG. 3-14). The sound cluster that was created for the sound trajectory according to the cars movement is indicated with black color. The acoustic clusters are created based on the acoustic equipment of the audience seats (FIG. 15-17) which are located nearby or one single seat. The acoustic equipment consists of high-frequency speakers, mini subwoofers and hollow spaces in the seats construction that ensure that the spectator is surrounded by the frequency spectrum of the sound field. The sound volume and frequency spectrum for the sound effects, that a single spectator is exposed to, are calculated in compliance with the sounds that are reproduced by the neighbor seats to ensure a high quality of the sound spectrum heard by each single spectator and to avoid unwanted sound distortion.

When the sound moves according to the indicated trajectories, the sound movements are synchronized with the images shown on the screen (or at the stage) in accordance with the movements of the displayed objects, things, people, natural events etc. The sound volume for the trajectories (the sound effects for the directional actions on the screen) reproduced at the audience seats is adjusted that way that the spectators only feel the movements of the objects on the screen. Meanwhile the general background sound, music, people's conversations or the sounds of different actions that have no obvious direction are performed by the basic sound system that is located on the walls and the ceiling of the audience. The audience seats don't participate in the reproduction of these sound effects in order to avoid an overload at the acoustic sense of the spectators. The switching between the equipment of the acoustic clusters can be performed by a computerized sound controller—a processor-based control unit ("sound processor") interrelated with the movie projector, or the clusters can be switched over manually/in an improvisation mode (by a "DJ" or "music director") which is especially suitable for theater performances or concerts. This ensures the dynamic control over the sound movements according to "linear" and "non-linear" trajectories ("strips" of the sound movement and "cells" of the sound field) that cross the audience. The obvious consequence of this feature is the overall improvement of the sound quality in the audience.

Figure 15:
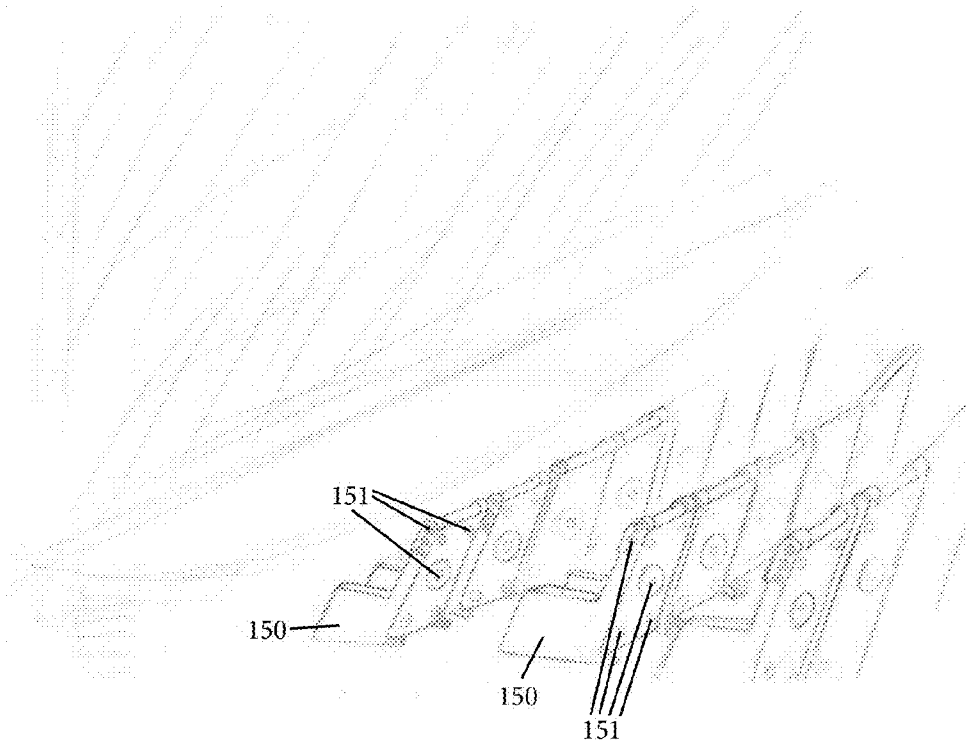
FIG. 15: Location scheme of the audience seats with acoustic equipment.
Figure 16:
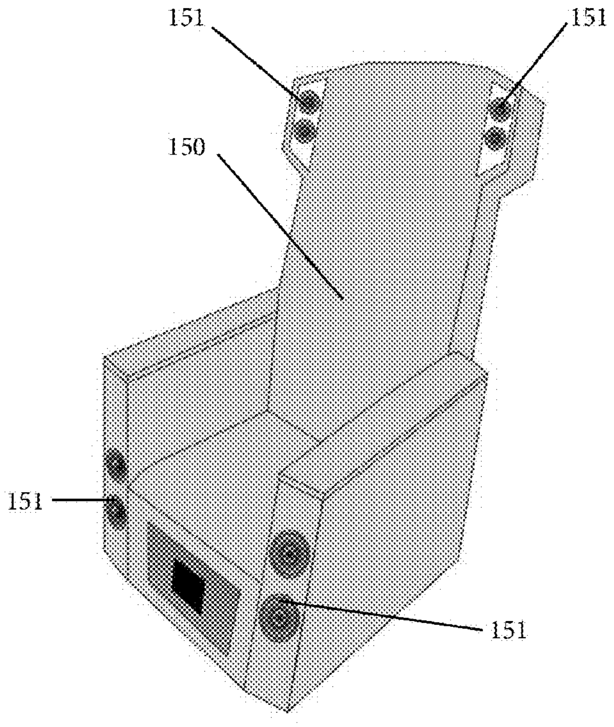
FIG. 16: Sample embodiment of an audience seat in axonometric projection.
Figure 17:
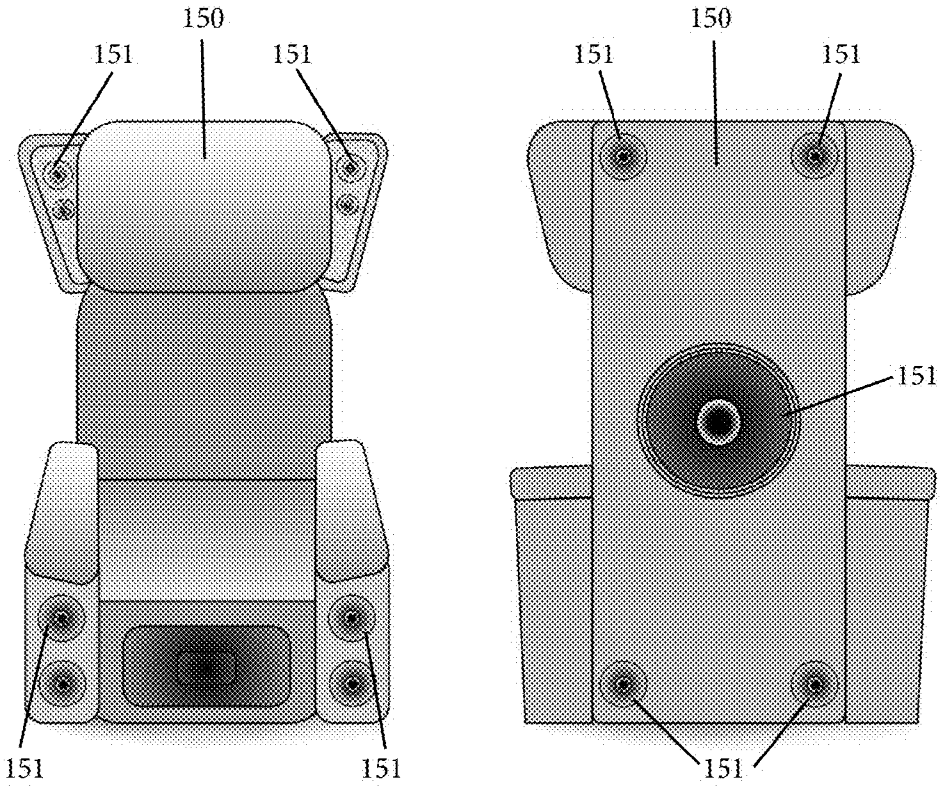
FIG. 17: Sample embodiment of the audience seats in two projections.

Specifically regarding FIGS. 15-17, an embodiment of seats of the present invention are shown in various views. As can be seen in the figures, each seat 150 comprises a plurality of speakers 151 of varying size and orientation. These speakers may be in communication with the computerized sound controller, which can activate and deactivate one or a plurality of the speakers 151 of one or a plurality of seats 150.

The sound trajectories ("strips") can correspond to a moving car (FIG. 3-11), a running person, a flying bird, a blast of wind, a flying airplane (FIG. 12-14) etc. shown on the screen or at the stage, which creates the feeling that the action is performed next to the spectator. Below is the nonexclusive list of sample embodiments and uses of the present invention.

I) Storm. The waves brake against the shore which is shown in the direction of the audience. The sound of the waves moves from the first to the last seat row of the audience. The acoustic cluster can consist from all seats of one row. In this case the sound moves row by row to the back of the audience according to these clusters. The spectators at the audience will have the feeling like a sea wave is moving trough the audience from the first to the last row.

II) A bird's flight. The acoustic cluster can consist of two or three seats. The bird's screams and the flight sound move through the audience according to the trajectory of the bird's flight. For example the clusters can be switched such way that the sound makes several circles in the audience. The spectators will have the feeling that there is really a bird flying around them. And the spectators who are sitting in the clusters which are activated by the sound trajectory will have the feeling that the bird is flying right above them.

III) Gun Shots. The gunman on the screen or at the stage make gun shots at an angle to the audience. The sound of the flying bullets moves diagonally from the seats in the first row to the seats in the last row. In this case the acoustic cluster can consist of one single seat. The sound will move through the indicated clusters in the audience and create the effect of a flying-by bullet.

IV) Run. For example a running animal moves from the left side to the right and then runs directly towards the audience. The sound of the running legs and the noise of the disturbed plants move first from left to the right and then from the first row to the last row in the audience according to the indicated clusters.

V) Moving car. The car moves quickly from the right side of the screen to the left and stops suddenly. The sound of the moving car and the break squeak move from the seats on the right side to the seats at the left side going through the indicated clusters and stops for example in the middle of the audience. The spectators will have the feeling that the car moves from right to the left and stops almost in the middle of the audience.

VI) A battle. This scenario can include any number of acoustic clusters according to the idea of the movie or concert show creator. Each single cluster will correspond to one sound action: flying bullets, bombshells, mines, explosions, destruction of buildings etc. The spectators will have the feeling to be involved directly into the actions which are shown on the screen or at the stage. They will be surrounded by the sounds of whistling bullets, flying airplanes, explosions in different parts of the audience etc. The spectator in the audience dives right into the action and feels that he's a participant.

Those skilled in the art will appreciate that the invention can be practiced by other than the described embodiments of sound control systems, where each single case is determined by the script of the movie or performance, by the acoustic features of the particular audience space and other factors.

As described above, the present method provides the dynamic control over the sound movements at "linear" and "non-linear" trajectories ("strips" of the sound movement and "cells" of the sound field) that cross the audience. This new sound technology for movies, concerts and show performances will drastically increase the audience appeal and the impressions from the shows.

What is claimed is:

1. A sound control system, comprising:

a basic sound system located on walls and/or a ceiling producing a general background sound;

the basic sound system being controlled by a basic sound track;

a sound effects system in a plurality of seats arranged in a seating area, each of the plurality of seats comprising a plurality of speakers, the sound effect system being controlled by a track for sound effects via a computerized sound effects controller; the track for sound effects being different from the basic sound track;

the sound effects controller is in communication with the plurality of speakers of each of the plurality of seats, the computerized sound effects controller dividing the plurality of seats into a plurality of clusters, each of the plurality of clusters comprising at least one seat;

wherein the computerized sound effects controller is further configured to activate at least one speaker of the at least one seat of one of the clusters, and further configured to deactivate the at least one speaker and activate another at least one speaker of at least one seat of an adjacent cluster to the one of the clusters;

wherein the activation and deactivation of the at least one speakers of the adjacent clusters causes a movement of at least one sound effect through the plurality of seats in the seating area.

2. The sound control system of claim 1, further comprising a display screen at a front of the seating area.

3. The sound control system of claim 1, wherein the sound system thriller comprises at least one speaker in the seating area that is not part of the plurality of seats.

4. The sound control system of claim 1, wherein one of the plurality of clusters comprises all of the seats in a row of the plurality of seats.

5. The sound control system of claim 1, wherein one of the plurality of clusters comprises all of the seats directly behind and in front of each other of the plurality of seats.

6. The sound control system of claim 1, wherein each of the plurality of dusters comprises between two and five adjacent seats.

7. The sound control system of claim 1, wherein the seating area is a theater.

8. The sound control system of claim 1, wherein the basic sound track and the track for sound effects are two separate track recorded on a movie film.

9. The sound control system of claim 1, wherein the basic sound track is recorded on a movie film, and the track for sound effects is recorded on a separate digital medium.

10. The sound control system of claim 1, wherein the track for sound effects is manually produced or improvised by an operator during a show.

11. A method of providing a sound trajectory across a plurality of seats arranged in a seating area, comprising the steps of:

producing a general background sound via a basic sound system located on walls and/or a ceiling; the basic sound system being controlled by a basic sound track;

producing sound effects via a sound effects system located in the plurality of seats arranged in the seating area, the sound effect system being controlled by a track for sound effects via a computerized sound effects controller; the track for sound effects being different from the basic sound track, dividing the plurality of seats into the plurality of clusters comprising at least one of the plurality of seats by the computerized sound controller;

activating, by the computerized sound controller, the at least one of the plurality of speakers of each seat of one of the plurality of clusters;

after the activating, deactivating the at least one of the plurality of speakers of each seat of one of the plurality of clusters by the computerized sound controller; and after or during the deactivating step, activating, by the computerized sound processor, at least one of the plurality of speakers of each seat of a second of the plurality of clusters, the second of the plurality of clusters adjacent to the one of the plurality of clusters in the seating area.

* * * * *